May 10, 1955                N. E. PRYSLAK                2,708,249
                    ULTRA HIGH FREQUENCY ELECTRON TUBE
                          Filed Dec. 5, 1950
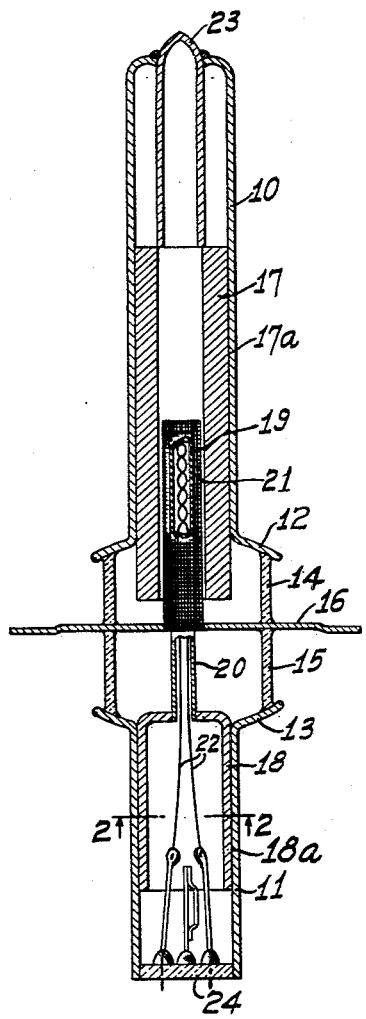
Fig_1
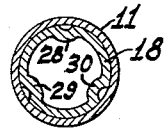
Fig_2
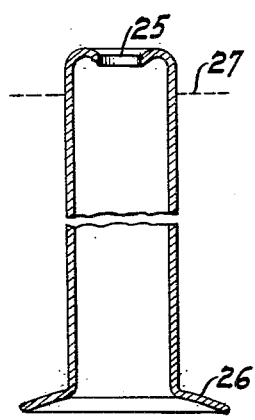
Fig_3
INVENTOR
*Nicholas E. Pryslak*
BY
*William A. Zalesak*
ATTORNEY

United States Patent Office 2,708,249
Patented May 10, 1955

2,708,249
ULTRA HIGH FREQUENCY ELECTRON TUBE

Nicholas Edward Pryslak, Florham Park, N. J., assignor to Radio Corporation of America, a corporation of Delaware Application December 5, 1950, Serial No. 199,305

2 Claims. (Cl. 313—285)

My present invention relates to electron tubes, and more particularly to electron tubes having concentric tubular elements in force-fit relation to facilitate manufacture of such tubes and to provide good contact between and fix said elements against relative movement.

One type of electron tube in which the invention is particularly advantageous is known as the "modified lighthouse" or "pencil" type. As the names suggest, the tube is an elongated structure having a disc extending through the envelope wall intermediate the ends of the device. Each end portion of the device comprises a plurality of concentric tubular metal members, usually machine made to relatively close tolerances, so that the inner members fit snugly within the outer members. The outer members and the disc referred to serve as leads for electrodes within the device.

In one form of this type of tube, the anode is a tubular structure having relatively thick walls and fitting snugly within one of the tubular end portions of the device. The anode is usually fixed to its associated tubular end portion as by brazing. The cathode is of the indirectly heated sleeve type and is fixed as by welding or brazing to one end of a tubular support member. The walls at one end portion of this support member are collapsed inwardly to provide a relatively small opening for receiving an end of the cathode sleeve. The cathode support member fits snugly within the other of the tubular end portions of the device and is fixed thereto as by a braze of relatively small area. The disc referred to has a centrally disposed aperture for receiving and supporting a tubular mesh type grid. The dimensions of the anode, cathode and grid referred to are such that the cathode telescopes into the grid and the grid telescopes into the anode, thus providing a concentric array of these electrodes.

In view of the critical transverse dimensions required of the end portions of the device and of the anode, and cathode support, to assure a snug fit of the latter parts within said end portions, it has been the practice heretofore to fabricate these elements to relatively close tolerances. The requirement for close tolerances has made recourse to machining methods necessary. One disadvantage of machining methods is the relatively long time required thereby. A further disadvantage is the relatively massive structures of work pieces required in a machining process to preserve the work pieces from deformation in response to the force of the cutting tool used in such process. This massiveness in addition to adding unnecessary weight to the finished product deprives the parts of a desirable flexibility or springiness that would contribute to the stability with which certain of the parts are fixed to each other. Furthermore, not all metals or metal alloys lend themselves to machining, by reason of their softness or for other reasons.

An alternative to the machining method is the drawing process in which the work pieces are drawn to a desired form. While this process necessarily involves less massive work pieces, is less critical as to the metal of which the work pieces are made, and requires less time per unit, the parts formed thereby do not conform to the precision standards of parts made by the machining method which have been regarded necessary for a snug fit.

Since the outer members of the concentric structures serve as lead-ins of the device, as aforementioned, it is essential that there be good electrical contact between the concentric members. In the past, reliance has been placed mostly on a limited area braze between these members. Pressure contact between the members has been absent, due to the close tolerances observed therebetween. These close tolerances provide for no pressure of one of the members on the other. In brazing one of the members to the other therefore, it is necessary to subject the brazing material to its normal fusing temperature. For some types of brazing materials this temperature is relatively high and exceeds substantially the temperature employed in exhausting the device in which the members are used.

It is accordingly an important object of the invention to provide an improved electron tube of the type employing concentric tubular metal members fixed to each other in a snug fit.

A further object is to provide an electron tube having concentric tubular members wherein said members engage each other with increased force for strengthening a desired fixed relationship between said members.

Another object is to provide an electron tube having concentric tubular elements, wherein said elements are brazed to each other at a substantially lower temperature than the fusion temperature of the brazing material.

A further object is to facilitate the fabrication of an electron tube, by brazing parts thereof together at a temperature substantially equivalent to the temperature used in exhausting the finished tube.

Another object is to provide tubular components of an electron tube having relatively wide dimensional tolerances and yet permitting a snug fit of one of the work pieces within the other.

A further object is to provide an electron tube having tubular intrafitting components wherein the transverse dimensions of said components are characterized by reduced critical requirements and provide a fit of increased snugness of one of the components within the other.

A further object is to provide drawn metal tubular parts for an electron tube wherein one of said parts is snugly received within another of said parts.

Another object is to provide an electron tube having drawn concentric tubular metal elements, wherein the outer transverse dimension of the inner of said elements as a work piece is greater than the inner transverse dimension of the outer of said elements.

A further object is to provide an electron tube having concentric tubular metal elements of reduced wall thickness for imparting a flexibility to said elements for permitting one of said elements to snugly receive the other of said elements.

Another object is to provide two drawn concentric elements in an electron tube wherein one of the elements is more flexible than the other, for providing a snug fit between said elements in the absence of close tolerance standards for said elements.

According to one aspect of the invention, concentric tubular parts of an electron tube comprising an outer tubular metal end portion of the tube and an inner tubular cathode support, are of drawn construction to reduce the wall thickness of the tubular parts and to render the parts more flexible. In addition, the inner part is deformed symmetrically around its periphery to further increase its flexibility. As a consequence of this flexibility of the parts, it is feasible to draw the parts, in spite of the relatively wide tolerances that characterize this method of fabrication, since it is possible to utilize the flexibility of the parts to compensate for the absence of close tolerance standards, for securing a snug fit of one of the parts within the other. The flexibility of the parts moreover stabilizes the engagement therebetween and supplements other means such as brazing, for maintaining the parts in fixed relation. In addition the brazing operation may be performed at a lower temperature than the fusion temperature of tthe brazing material, due to the pressure between the parts at the region of the braze.

According to another aspect of the invention, concentric tubular parts comprising a drawn outer part serving as the other end portion of the electron tube and a machined inner part serving as the anode of the tube, are assembled in snug fitting relation, although the outer drawn part does not conform to a close size tolerance. The snug fit resuslts from the relatively thin walls of the drawn part which render it relatively flexible in respect of the thicker walled machined anode. Thus the anode can be provided deliberately and intentionally with a larger outer transverse dimension than the inner transverse dimension of the outer drawn part, and forcefully fitted into the drawn part. A compression force will then be applied by the relatively flexible drawn part on the anode, to strengthen the fixed relation of the parts.

Further objects and advantages of the invention will manifest themselves as a more detailed description thereof proceeds, taken in connection wieh the appended drawing, in which:

Figure 1 is a sectional elevation of an electron tube including the invention;

Figure 2 is a cross-section along the line 2—2 of Figure 1 and shows deformations in the inner member for increasing its flexibility; and Figure 3 is an elevational cross-section of an outer tubular member employed according to the invention and which comprises a drawn eyelet form.

Referring now to the drawing in more detail, there is shown in Figure 1 thereof an electron tube in which the invention may be employed advantageously. The tube includes metal tubular end portions 10, 11 having flanges 12, 13 respectively. One end of a short glass tube 14 is sealed to flange 12, and one end of another short glass tube 15 is sealed to flange 13. The other ends of the glass tubes referred to are sealed to a metal disc 16.

The end portions 10 and 11 and the disc 16 each support an electrode. The end portion 10 supports a tubular anode 17; the end portion 11 supports a tubular cathode support 18, the latter in turn supporting a cathode 19 having an inactive portion 20; and the disc 16 supports a tubular grid 21 of meshed construction. A heater 22 serves to energize the cathode 19.

End portion 10 is closed at one end by an exhaust tubulation 23, and end portion 11 is closed by a flat glass stem 24 through which the heater leads 22 extend.

In addition to serving as electrode supports, end portions 10, 11 also serve as lead-ins of the device. Thus end portion 10 is effectively the lead-in for anode 17; and end portion 11, is the lead-in to the cathode 19. Because of their service as lead-ins, it will be appreciated that the end portions referred to should have good contact with the electrodes referred to.

Because of the required good contact between the end portions referred to and the electrodes they support, it has heretofore been the practice of machining the end portions and their associated electrode and electrode support, to relatively close tolerances in order to approximate the snug fit required for such contact. But machining operations to close tolerances are characterized by several disadvantages. One of such disadvantages is the critical control required for such operations. This critical control slows down the operation appreciably and requires close operator supervision. Another disadvantage is the fact that machined parts are usually massive, adding unnecessary weight to the parts so processed. This massiveness is necessary to enable the parts to oppose the appreciable force of a cutting or machining tool without physical distortion. Where the manufacture of electron tubes is concerned involving the fabrication of a relatively large number of units, the relative slowness, operator supervision, and required massiveness of parts incidental to machining methods are serious factors in the cost of such tubes.

According to the invention, at least one of a pair of concentric tubular elements of an electron tube are made by drawing the same to eyelet form. The drawing operation is relatively fast and thin walled work pieces are characteristically formed by this method. Thus the end portions 10, 11 of the tube shown in Figure 1 are formed by drawing to eyelet form as shown in Figure 3. When used as end portion 10, the eyelet may be used as initially formed. The upper inwardly collapsed portion provides an opening of suitable size for receiving exhaust tubulation 23. The flange 26 on the eyelet of Figure 3 serves as a sealing flange as shown at 12 and 13 in Figure 1. When the eyelet is used as the end portion 11, of Figure 1, it may be cut off along dotted line 27 of Figure 3 to provide the enlarged opening for receiving glass stem 24 with leads 22 extending therethrough.

In addition to using the drawn eyelet construction for the end portions 10 and 11, this construction is also adapted for the tubular cathode support 18. The cathode support referred to is of course drawn to smaller size than end portions 10, 11 in order to fit within end portion 11, as shown.

It will be noted that the drawn eyelet form of end portions 10, 11 and cathode support 18, includes relatively thin walls. This is of advantage in that it contributes flexibility to the walls. For example, the anode 17 according to the invention is intentionally made slightly wider than the internal dimensions of end portion 10. In spite of its excessive width, the anode can be force fitted into end portion 10 due to the yieldable character of the walls thereof resulting from the thinness of the walls.

As a consequence of the yielding character of the thin walls referred to, the anode need not be made to high precision standards. The only critical factor to bear in mind is that the outer diameter of the anode should be larger than the inner diameter of end portion 10, within relatively wide limits. Thus, while the relative size of these parts should be such as to require a force fit of the one within the other, any slight variation in anode diameter will merely require a greater or less force in effecting the force fit referred to. Once the force fit is completed, the end portion 10 will continue to exert a compressive force on anode 17, to preserve the engagement between these elements and prevent relative movement therebetween. It will therefore be appreciated that neither the end portion 10 nor the anode 17 need to be processed to close tolerances. The more economical drawn form of end portion 10 provided by the invention directly contributes to economical fabrication of the anode 17.

As distinct from the assembly including anode 17 and end portion 10, in which the inner member (the anode 17), is relatively non-yielding in character, the assembly including the other end portion 11 and cathode support 18, comprises two yieldable members. While a force fit between the end portion 11 and support 18 is desirable in this instance also, it is subject to a limitation in the ability of the support 18 to withstand compression forces applied by the end portion 11. If the support is perfectly round or oval, the thinness and consequent yieldability of its walls will result in a buckling or other deformation of the support in response to compression forces thereon of a relatively high order. There is danger therefore in this case that good contact between the end portion 11 and the cathode support 18 might be impaired.

To overcome this difficulty, the invention provides for a novel form of the support 18. As shown in Figure 2, this support is provided with a plurality of even spaced expansion joints 28, 29, 30, extending longitudinally of the support. These joints constitute relatively weak peripheral portions of the support referred to, which absorb compressive forces applied by the end portion 11 which inwardly forces said support under appreciable flexure. However, while the expansion joints referred to are weaker than other peripheral portions of the support 18, they are capable of withstanding appreciable compressive forces, so that a relatively tight engagement is assured between end portion 11 and the support, required for good contact between the parts and preservation of the engagement.

In addition to preventing undesired deformation of support 18 when compressed by end portion 11, the expansion joints referred to permit greater leeway in tolerance requirements of these parts. Thus not only are these parts free from close tolerance requirements and may therefore be of drawn eyelet construction, but even the inherently reduced critical tolerance of this construction may be further reduced, if desirable for increased output, in view of the wider range of dimensions to which the expansion joints referred to accommodate the tubular cathode support 18.

The electron tube shown in Figure 1 is suitable for use at relatively high frequencies. The conductive character of surfaces of the leads or end portions 10, 11 and the cathode supoprt 18, are therefore important. An expedient heretofore adopted has been the application of a coating of silver to the portions of these surfaces forming conductive paths. According to the invention, the silver coating in addition is applied to the outer surfaces of the anode 17 and cathode support 18 as well as to the inner surface of the end portions 10 and 11. Thus when then anode and cathode support referred to are force fitted into the end portions mentioned, a silver coating 17a will become interposed between the anode and its associated end portion and a silver coating 18a between the support 18 and end portion 11. Due to the compressive forces of the end portions referred to on these inner members, the brazing material fuses at a much lower temperature than its normal fusion temperature.

The anode 17 and end portion 10 are first fabricated as a sub-assembly. After the anode is force fitted into end portion 10 by means of a jig not shown, the sub-assembly may be heated in hydrogen to a temperature of 900° C. This causes a fusion to take place between the silver coating and the metals of the anode and end portion 10. This fusion is of substantial volume as a consequence of the relatively high temperature used, and is in the nature of a braze. This braze supplements the compression force of end portion 10 on anode 17 to further increase the stability of engagement between these parts and improves the electrical contact between the parts.

While the end portion 10 and anode 17 are fabricated as a sub-assembly prior to the assembly of other parts of the tube shown in Figure 1, the other end portion 11, as distinct from this, is first assembled as part of the tube and subsequently the support 18 is extended thereinto by means of a suitable jig, not shown. While the coating 18a of silver in this case is also disposed between the support 18 and end portion 11 when assembled, the temperature to which these parts are subjected is much less than 900° C. as in the previous instance, and in fact is the temperature at which the tube is exhausted, which is about 400° C. While the fusion or braze between support 18 and end portion 11 is accomplished at a lower temperature than in the case of anode 17 and end portion 10, the compression force of end portion 11 on support 18 causes the silver brazing material to fuse at much lower temperature. The resultant engagement between the end portion 11 and support 18, is characterized by an overall stability of engagement that is as great as if not greater than that between the anode and end portion 10. This is because the flexure of support 18 at its expansion joints provides a relatively large reservoir of force for stabilizing the engagement between it and the end portion 11.

It will be appreciated from the foregoing that I have provided a novel electron tube having component parts in the form of drawn structures. The drawing of sheet metal or relatively thin stock to eyelet form is a well advanced art and is more economical than machining processes. For the end portion 10, the eyelet may be used in the form initially drawn, and the end portion 11 and support 18 require only a relatively minor modification in the eyelet form to adapt it to their use.

While the drawn eyelet form of the parts referred to is less critical as to dimensions as a consequence of the mass production of these forms with a minimum of supervision, than custom made machine parts, the inherent thinness of the stock used in drawing, and a further thinning thereof during drawing, confer a flexibility thereto that permits a force fit of the parts even though the dimensions thereof do not observe relatively close tolerances.

There results therefore from the draw eyelet form of construction and the expansion joints in one of the parts, an improved electron tube of increased stability, reduced weight, increased speed of manufacture, and reduced cost.

It will be obvious to persons skilled in the art that the invention is subject to many modifications within the realm of equivalents without departing from its spirit, and it is desired to include such modifications within the scope of the appended claims.

I claim:

1. An electron tube having an evacuated envelope including a tubular metal end portion comprising a lead-in for said tube and having an inner wall defining a cylindrical space, a tubular cathode in a predetermined position within said envelope, and a support fixed to one end of said cathode and mounted in said end portion and supporting said cathode in co-axial relation with said metal end portion, said support being tubular and including angularly spaced wall portions having outer surfaces snugly engaging said inner wall of said metal end portion, said support including another wall portion between and laterally integral with two of said wall portions, said another wall portion being curved inwardly of and spaced from said inner wall of said metal end portion, and under appreciable flexure inwardly and transversely of said support and urging said wall portions against said inner wall, said support engaging said metal end portion frictionally for ruggedly supporting said cathode in said predetermined position during normal tube life.

2. An electron tube comprising an evacuated envelope, a lead-in forming part of and fixed to said envelope and having smooth inner walls within said envelope, a tubular support within said envelope having longitudinal corrugations in its outer surface providing outwardly raised portions engaging said inner wall and inwardly depressed portions urging said raised portions against said inner wall, each of said raised portions being adjacent two of said depressed portions and laterally integral therewith, and a tubular electrode within said envelope and fixed at one end to and extending coaxially with said support, said support being coaxial with said lead-in, said depressed portions being flexed inwardly of said support for providing a continuing force urging said raised portions against said smooth inner wall of said lead-in in a frictional engagement, said force preserving said lead-in, support, and electrode in coaxial relation during a normal life of said tube.

References Cited in the file of this patent

UNITED STATES PATENTS

| | | |
|---|---|---|
| 2,324,089 | Johnson | July 13, 1943 |
| 2,363,980 | Lauck | Nov. 28, 1944 |
| 2,397,308 | Barnes | Mar. 26, 1946 |
| 2,402,119 | Beggs | June 18, 1946 |
| 2,456,714 | Law | Dec. 21, 1948 |
| 2,461,303 | Watson | Feb. 8, 1949 |
| 2,500,355 | Haas | Mar. 14, 1950 |